US011205005B2

(12) United States Patent
Pardini et al.

(10) Patent No.: US 11,205,005 B2
(45) Date of Patent: Dec. 21, 2021

(54) IDENTIFYING MICROARCHITECTURAL SECURITY VULNERABILITIES USING SIMULATION COMPARISON WITH MODIFIED SECRET DATA

(71) Applicant: International Business Machines Corporation, Armonk, NY (US)

(72) Inventors: Matthew Michael Garcia Pardini, Middlesex, MA (US); Gregory William Alexander, Pflugerville, TX (US); Jonathan Ting Hsieh, Poughkeepsie, NY (US); Michael P Mullen, Poughkeepsie, NY (US); Olaf Knute Hendrickson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/578,739

(22) Filed: Sep. 23, 2019

(65) Prior Publication Data
US 2021/0089659 A1 Mar. 25, 2021

(51) Int. Cl.
*G06F 21/57* (2013.01)
*G06F 21/85* (2013.01)

(52) U.S. Cl.
CPC ............ *G06F 21/577* (2013.01); *G06F 21/85* (2013.01); *G06F 2221/034* (2013.01)

(58) Field of Classification Search
CPC ... G06F 21/577; G06F 21/85; G06F 2221/034
See application file for complete search history.

(56) References Cited

U.S. PATENT DOCUMENTS 8,683,583 B2 3/2014 Miller et al.
9,189,617 B2 11/2015 Sherman
(Continued)

OTHER PUBLICATIONS

Chen et al.; "SGXPECTRE Attacks: Stealing Intel Secrets from SGX Enclaves via Speculative Execution"; The Ohio State University; arXiv:1802.09085v3 [cs.CR]; Jun. 3, 2018; 16 pages.
Hendrickson et al.; "Targeted Very Long Delay for Increasing Speculative Execution Progression"; U.S. Appl. No. 16/578,741, filed Sep. 23, 2019.
Kocher et al.; "Spectre Attacks: Exploiting Speculative Execution"; Cornell University, Cite As: arXiv:1801.01203; Jan. 3, 2018; 16 pages.
(Continued)

*Primary Examiner* — Ashokkumar B Patel
*Assistant Examiner* — William B Jones
(74) *Attorney, Agent, or Firm* — Cantor Colburn LLP; Margaret McNamara (57) ABSTRACT

A computer-implemented method for detecting vulnerabilities in microarchitectures. A non-limiting example of the computer-implemented method includes creating a simulation for execution on a model of a microarchitecture, the simulation including a set of instructions and a placeholder for holding a piece of secret data. The computer-implemented method executes the simulation a first time on the model of the microarchitecture with a first piece of secret data stored in the placeholder and stores a first output of the first executed simulation. The computer-implemented method executes the simulation a second time on the model of the microarchitecture with a second piece of secret data stored in the placeholder and stores a second output of the second executed simulation. The computer-implemented method compares the first output with the second output and provides an indication of a microarchitecture vulnerability when there is a difference between the first output and the second output.

20 Claims, 3 Drawing Sheets

(56) References Cited

U.S. PATENT DOCUMENTS

| | | | |
|---|---|---|---|
| 9,262,170 | B2 | 2/2016 | Krishna et al. |
| 9,665,674 | B2 | 5/2017 | Cho et al. |
| 9,891,926 | B2 | 2/2018 | Emma |
| 9,934,341 | B2 | 4/2018 | Berry et al. |
| 2002/0184613 | A1 | 12/2002 | Kuzemchak et al. |
| 2004/0111594 | A1 | 6/2004 | Feiste et al. |
| 2009/0204384 | A1 | 8/2009 | Akiba et al. |
| 2010/0250497 | A1* | 9/2010 | Redlich ............... H04L 63/0227 707/661 |
| 2011/0191854 | A1 | 8/2011 | Giakouminakis et al. |
| 2013/0013283 | A1 | 1/2013 | Gam |
| 2014/0201843 | A1 | 7/2014 | Hibbert et al. |
| 2014/0310814 | A1 | 10/2014 | Hay et al. |
| 2016/0232084 | A1* | 8/2016 | Bhat ................... G06F 11/3664 |
| 2017/0019422 | A1 | 1/2017 | Makowski et al. |
| 2017/0351318 | A1 | 12/2017 | Gu et al. |
| 2018/0241548 | A1 | 8/2018 | Dolev et al. |
| 2021/0264027 | A1* | 8/2021 | Venkataramani ..... G06F 21/554 |

OTHER PUBLICATIONS

Lipp et al.; "Meltdown"; Cornell University, Cited As: arXiv:1801.01207; Jan. 3, 2018; 16 pages.
List of IBM Patents or Patent Applications Treated as Related; Date Filed: Sep. 24, 2019, 2 pages.
Walcott et al.; "Dynamic Prediction of Architectural Vulnerability from Microarchitectural State"; ISCA'07 34th ACM Annual Inter. Symp. On; Jun. 9-13, 2007; 12 pages.
Wu et al.; "Eliminating Timing Side-Channel Leaks using Program Repair"; ISSTA'18 27th ACM SIGSOFT International Symposium On; arXiv:1806.02444v2 [cs.CR]; Jul. 21, 2018; 12 pages.
Zhang et al.; "Identifying Security Critical Properties for the Dynamic Verification of a Processor"; ASPLOS'17 22nd ACM Inter. Conf. On; Apr. 8-12, 2017; 14 pages.
Transmittal Form PTO/SB/21, signed Mar. 17, 2020.

* cited by examiner

IDENTIFYING MICROARCHITECTURAL SECURITY VULNERABILITIES USING SIMULATION COMPARISON WITH MODIFIED SECRET DATA

BACKGROUND

The present invention generally relates to microarchitectural security and more specifically, to identifying microarchitectural security vulnerabilities using simulation comparison with modified secret data.

Many modern microprocessors have critical vulnerabilities that allow malicious programs to steal data being processed on computers having these microprocessors. Programs are typically not allowed to read data from other programs, but malicious programs can exploit microprocessor vulnerabilities to take secrets stored in the memory of other running programs. This secret data may include, for example, passwords, personal photos, emails, messages, or business-critical documents. Thus, it is important during the design of modern microprocessors to create designs that do not have these vulnerabilities.

SUMMARY

Embodiments of the present invention are directed to a computer-implemented method for detecting vulnerabilities in microarchitectures. A non-limiting example of the computer-implemented method includes creating a simulation for execution on a model of a microarchitecture, the simulation including a set of instructions and a placeholder for holding a piece of secret data. The computer-implemented method executes the simulation a first time on the model of the microarchitecture with a first piece of secret data stored in the placeholder and stores a first output of the first executed simulation. The computer-implemented method executes the simulation a second time on the model of the microarchitecture with a second piece of secret data stored in the placeholder and stores a second output of the second executed simulation. The computer-implemented method compares the first output with the second output and provides an indication of a microarchitecture vulnerability when there is a difference between the first output and the second output.

Embodiments of the present invention are directed to a system for detecting vulnerabilities in a microarchitecture. A non-limiting example of the system includes a processor and memory coupled to the processor. The memory has stored therein instructions that when executed cause the processor to create a simulation for execution on a model of a microarchitecture, the simulation including a set of instructions and a placeholder for holding a piece of secret data. The processor executes the simulation a first time on the model of the microarchitecture with a first piece of secret data stored in the placeholder and stores a first output of the first executed simulation. The processor executes the simulation a second time on the model of the microarchitecture with a second piece of secret data stored in the placeholder and stores a second output of the second executed simulation. The processor compares the first output with the second output and provides an indication of a microarchitecture vulnerability when there is a difference between the first output and the second output.

Embodiments of the invention are directed to a computer program product for detecting vulnerabilities in a microarchitecture, the computer program product comprising a computer readable storage medium having program instructions embodied therewith. The program instructions are executable by a processor to cause the processor to perform a method. A non-limiting example of the method includes creating a simulation for execution on a model of a microarchitecture, the simulation including a set of instructions and a placeholder for holding a piece of secret data. The method executes the simulation a first time on the model of the microarchitecture with a first piece of secret data stored in the placeholder and stores a first output of the first executed simulation. The method executes the simulation a second time on the model of the microarchitecture with a second piece of secret data stored in the placeholder and stores a second output of the second executed simulation. The method compares the first output with the second output and provides an indication of a microarchitecture vulnerability when there is a difference between the first output and the second output.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern microprocessors can have critical vulnerabilities that allow malicious programs to steal data being processed on computers having these microprocessors. Programs are typically not allowed to read data from other programs, but malicious, speculative execution attacks, such as Meltdown and Spectre, can exploit microprocessor vulnerabilities to take secrets stored in the memory of other running programs.

Meltdown and Spectre introduced the world to the idea of leveraging speculative execution to extract secrets from processors. Identifying these exploits took months for a multinational team of security researchers. Meltdown breaks down the isolation between user applications and an operating system. The attack permits a program to access memory of other programs and the operating system. Spectre breaks down the isolation between different user applications. It allows an attacker to trick programs into leaking secrets.

Computer platform designers need to ensure that these and similar exploits do not exist in their systems, but have to do so without the use of a large, multinational team due to the impracticality of such an arrangement. Some have suggested solutions via description languages additions where additional information is provided in the hardware description that is subsequently examined for violations. However, there are several drawbacks to this approach. First, the same designers who are thinking through the hardware must also think through the security declaration and could easily overlook something. Also, specifications used in this approach are non-trivial and not easy to conceptualize. In addition, the processor designer has additional serial work that cannot easily be parallelized.

Another suggested solution has been to create abstract representations of exploit strategies to generate design-specific test attacks. But, this requires a comprehensive model of the system and its coherent data transactions that can be exceptionally difficult and time-consuming.

Turning now to an overview of the aspects of the invention, one or more embodiments of the invention address the above-described shortcomings of the prior art by providing multiple simulations with the same stimulus but changing a secret piece of data that should not be accessible. Any difference in the execution of those simulations must be the product of observing the unobservable, secret piece of data. The embodiments of the invention are described with respect to running two simulations with different secret pieces of secret data and comparing the results, but alternative embodiments of the invention may run n-simulations with the same stimulus but using n different, respective secret data.

The above-described aspects of the invention address the shortcomings of the prior art by not requiring a significant investment in a complex microarchitecture model or a significant investment by a designer who may not recognize a potential exploit. Additionally, it does not require proving that something can be exploited; rather, it only requires an observable execution difference, which is a much lower bar for detection.

Figure 1:
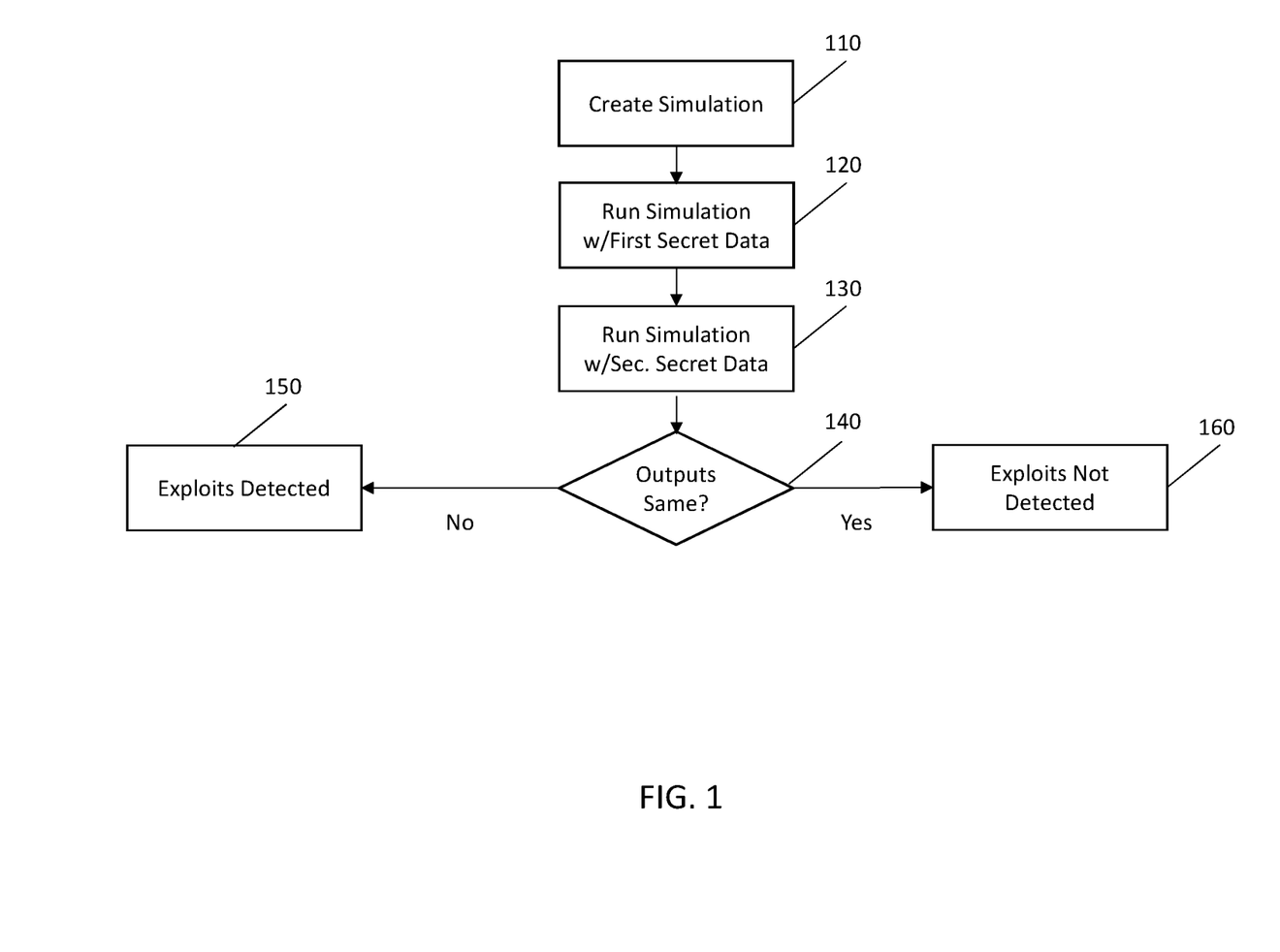
FIG. 1 depicts a flowchart of a first computer-implemented vulnerability testing method according to embodiments of the invention.

Turning now to a more detailed description of aspects of the present invention, FIG. 1 depicts a flowchart of a first computer-implemented vulnerability testing method according to embodiments of the invention. A simulation is initially created with a placeholder, or memory location, for containing secret data that should not be accessible or observable. (Stage 110). The simulation will properly select an address or addresses for secret data and avoid them everywhere in the simulation, except when using them knowing that the access will be protected. Additionally, a simulation generator will properly mark the secret data addresses for the simulation to use. The simulation is designed to be executed on a model of a processor architecture. The model may be hosted on a computer as described in FIG. 3, on a subset of a general processor, or a portion of a system that may not include a processor running instructions but that is still performing speculative work. The simulation includes a set of stimuli, along with the secret data, that will yield some output when executed on the model.

Once the simulation is created, the simulation is executed with a first piece of secret data stored at the placeholder. (Stage 120). The first piece of secret data can be generated at either test initialization time or when the simulation is initially generated. The secret data should be chosen at one of these times because it should be consistent throughout the entire simulation or it's likely the simulation will encounter consistency fails unrelated to actual security problems. Executing the simulation generates an output or result that should be independent of the secret data. In other words, the output should only depend on the stimuli of the simulation exclusive of the secret data. The simulation is executed again with a second piece of secret data stored at the placeholder. (Stage 130). This simulation, too, should have an output or result that is independent of the secret data.

By executing the simulation at least two times with each execution having different secret data, the computer-implemented method can detect if the output of the simulations is the same or different. If the outputs are not the same between different executions of the simulations having different secret data, this indicates that a vulnerability is present in the microarchitecture. This observable execution difference is a much lower bar for detecting a vulnerability than requiring proof that there is an exploit. The embodiments of the invention are described with respect to running two simulations with different secret pieces of secret data and comparing the results, but alternative embodiments of the invention may run n-simulations with the same stimulus but using n different, respective secret data.

Continuing with the computer-implemented method, a comparison is made of the outputs of the two simulations. (Stage 140). An output of the comparison may be filtered to remove unwanted noise stemming from the differences in the secret data used in the first and second execution of the simulation. If the outputs are not the same, an indication is given that vulnerabilities or exploits have been detected. (Stage 150). If the outputs are the same, then vulnerabilities or exploits have not been detected. (Stage 160).

Figure 2:
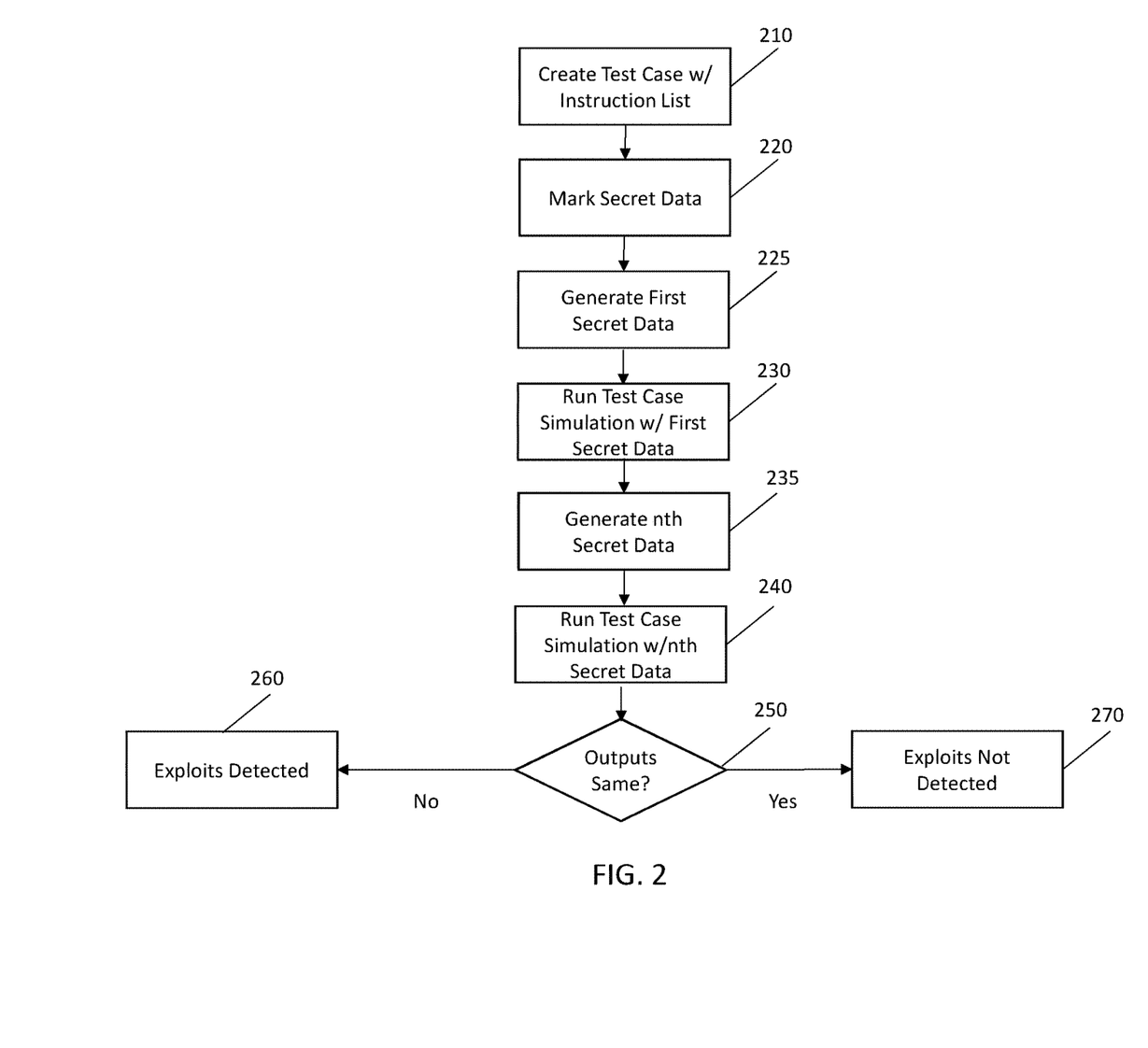
FIG. 2 depicts a flowchart of a second computer-implemented vulnerability testing method according to embodiments of the invention.

FIG. 2 depicts a flowchart of a second computer-implemented vulnerability testing method according to embodiments of the invention. In a second computer-implemented vulnerability testing method, a test case is generated with an instruction list to be executed on a model of as microarchitecture. (Stage 210). The test case will properly select an address or addresses for secret data and avoid them everywhere in the simulation, except when using them knowing that the access will be protected. Additionally, a test case generator will properly mark the secret data addresses for the simulation to use. The test case is designed to be executed on a model of a processor architecture. The test case may be hosted on a computer as described in FIG. 3, on a subset of a general processor, or a portion of a system that may not include a processor running instructions but that is still performing speculative work. The test case includes a set of stimuli, along with the secret data, that will yield some output when executed on the model. The test case is a simulation with initial state information and an expected result. An instruction being executed in the simulation that is expected to take a security-related exception has memory and data associated with it that form secret data. The secret data is marked as secret data in the test case at the time of test case generation. (Stage 220).

The test case is executed on the model with a first piece of secret data that is randomly generated (Stage 225) by the computer-implemented method and used instead of the secret data that was marked during test case generation, and the output of the test case is stored. (Stage 230). The first piece of secret data should be chosen at this time because it should be consistent throughout the entire simulation, or it's likely the simulation will encounter consistency fails unrelated to actual security problems. The test case is executed an nth time on the model with a second piece of secret data that is randomly generated by the computer-implemented method (Stage 235) and used instead of the secret data that was marked during test case generation, and the output of the test case is again stored. The nth piece of secret data should be chosen at this time because it should be consistent throughout the entire simulation, or it's likely the simulation will encounter consistency fails unrelated to actual security problems. (Stage 240). Stages 235 and 240 can be repeated n number of times, where n is greater than or equal to one.

As the outputs should be the same if there are no security vulnerabilities, the computer-implemented method compares the output of the first test case execution with the output of the n test cases executed. (Stage 250). An output of the comparison may be filtered to remove unwanted noise stemming from the differences in the secret data used in the first and nth execution of the simulation. One filtering method identifies the start and end of each speculation event, compares the output at the start of the event, and uses any differences as a mask against the differences at the end of the event. If the outputs are not the same, vulnerabilities or exploits have been detected, and an indication of vulnerabilities is given by the computer-implemented method. (Stage 260). If the outputs are the same, then vulnerabilities or exploits have not been detected, and an indication of no vulnerabilities found is given by the method. (Stage 270).

Figure 3:
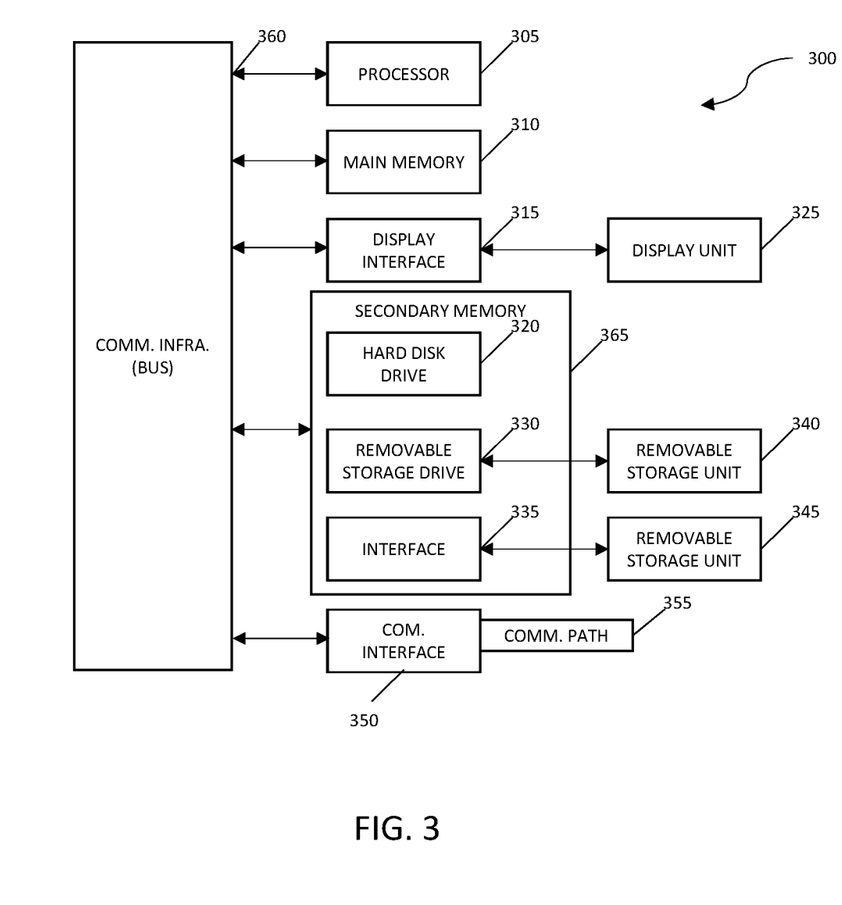
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   creating, by a processor, a simulation for execution on a model of a microarchitecture, the simulation including a set of instructions and a placeholder for holding a piece of secret data that should not be accessed during execution of the simulation;
   executing, by the processor, the simulation a first time on the model of the microarchitecture with a first piece of secret data stored in the placeholder;
   storing, by the processor, a first output of the first executed simulation;
   executing, by the processor, the simulation a second time on the model of the microarchitecture with a second piece of secret data stored in the placeholder;
   storing, by the processor, a second output of the second executed simulation; and
   comparing, by the processor, the first output with the second output and providing an indication of a microarchitecture vulnerability when there is a difference between the first output and the second output, wherein a difference between the first output and the second output indicates that one or both of the first piece or second piece of secret data was accessed from the placeholder during execution of the simulation.

2. The computer-implemented method of claim 1, wherein the first piece of secret data and the second piece of secret data are provided during creation of the simulation.

3. The computer-implemented method of claim 1, wherein the first piece of secret data and the second piece of secret data are provided upon executing the simulation.

4. The computer-implemented method of claim 1, wherein the first piece of secret data is randomly generated during creation of the simulation.

5. The computer-implemented method of claim 1, wherein the first piece of secret data is randomly generated upon executing the simulation.

6. The computer-implemented method of claim 1, further comprising:
   executing, by the processor, the simulation a third time on the model of the microarchitecture with a third piece of secret data stored in the placeholder;
   storing, by the processor, a third output of the third executed simulation; and
   comparing, by the processor, the first output, the second output, and the third output and providing an indication of a microarchitecture vulnerability when there is a difference between the first output, the second output, and the third output.

7. The computer-implemented method of claim 1, further comprising filtering a result of the comparison to remove unwanted noise stemming from differences in the first piece of secret data and the second piece of secret data.

8. A system comprising:
   a processor,
   memory coupled to the processor, the memory having stored therein instructions that when executed cause the processor to:
      create a simulation for execution on a model of a microarchitecture, the simulation including a set of instructions and a placeholder for holding a piece of secret data that should not be accessed during execution of the simulation;
      execute the simulation a first time on the model of the microarchitecture with a first piece of secret data stored in the placeholder;
      store a first output of the first executed simulation;
      execute the simulation a second time on the model of the microarchitecture with a second piece of secret data stored in the placeholder;
      store a second output of the second executed simulation; and
      compare the first output with the second output and provide an indication of a microarchitecture vulnerability when there is a difference between the first output and the second output, wherein a difference between the first output and the second output indicates that one or both of the first piece or second piece of secret data was accessed from the placeholder during execution of the simulation.

9. The system of claim 8, wherein the first piece of secret data and the second piece of secret data are provided during creation of the simulation.

10. The system of claim 8, wherein the first piece of secret data and the second piece of secret data are provided upon executing the simulation.

11. The system of claim 8, wherein the first piece of secret data is randomly generated during creation of the simulation.

12. The system of claim 8, wherein the first piece of secret data is randomly generated upon executing the simulation.

13. The system of claim 8, further comprising instructions that when executed cause the processor to:
   execute the simulation a third time on the model of the microarchitecture with a third piece of secret data stored in the placeholder;
   store a third output of the third executed simulation; and
   compare the first output, the second output, and the third output and providing an indication of a microarchitecture vulnerability when there is a difference between the first output, the second output, and the third output.

14. The system of claim 8, further comprising instructions for filtering a result of the comparison to remove unwanted noise stemming from differences in the first piece of secret data and the second piece of secret data.

15. A computer program product for detecting microarchitecture vulnerabilities, the computer program product comprising a computer readable storage medium having program instructions embodied therewith, the program instructions executable by a processor to cause the processor to:
   create a simulation for execution on a model of a microarchitecture, the simulation including a set of instructions and a placeholder for holding a piece of secret data that should not be accessed during execution of the simulation;
   execute the simulation a first time on the model of the microarchitecture with a first piece of secret data stored in the placeholder;
   store a first output of the first executed simulation;
   execute the simulation a second time on the model of the microarchitecture with a second piece of secret data stored in the placeholder;
   store a second output of the second executed simulation; and
   compare the first output with the second output and provide an indication of a microarchitecture vulnerability when there is a difference between the first output and the second output, wherein a difference between the first output and the second output indicates that one or both of the first piece or second piece of secret data was accessed from the placeholder during execution of the simulation.

16. The computer program product of claim 15, wherein the first piece of secret data and the second piece of secret data are provided during creation of the simulation.

17. The computer program product of claim 15, wherein the first piece of secret data and the second piece of secret data are provided upon executing the simulation.

18. The computer program product of claim 15, wherein the first piece of secret data is randomly generated during creation of the simulation.

19. The computer program product of claim 15, further comprising program instructions executable by the processor to cause the processor to:
   execute the simulation a third time on the model of the microarchitecture with a third piece of secret data stored in the placeholder;
   store a third output of the third executed simulation; and
   compare the first output, the second output, and the third output and providing an indication of a microarchitecture vulnerability when there is a difference between the first output, the second output, and the third output.

20. The computer program product of claim 15, further comprising program instructions executable by the processor to cause the processor to filter a result of the comparison to remove unwanted noise stemming from differences in the first piece of secret data and the second piece of secret data.

* * * * *